United States Patent
Townsend et al.

[11] Patent Number: 5,987,728
[45] Date of Patent: Nov. 23, 1999

[54] METHOD OF FORMING A VEHICLE TRANSMISSION CLUTCH HOUSING

[75] Inventors: David Richard Townsend, West Bloomfield; Thomas Meier, Rochester Hills, both of Mich.

[73] Assignee: Mascotech, Inc., Taylor, Mich.

[21] Appl. No.: 08/933,389

[22] Filed: Sep. 19, 1997

[51] Int. Cl.$^6$ .................................................. B23P 13/04
[52] U.S. Cl. ............................................ 29/557; 192/70.2
[58] Field of Search .................................. 29/557, 897.2, 29/DIG. 26; 192/70.2

[56] References Cited

U.S. PATENT DOCUMENTS

| | | | |
|---|---|---|---|
| 1,851,700 | 3/1932 | Gibbs | 29/557 |
| 4,705,150 | 11/1987 | Hill | 192/70.2 |
| 4,996,859 | 3/1991 | Rose et al. | 72/86 |
| 4,997,073 | 3/1991 | Fujioka et al. | 192/70.2 |
| 5,384,949 | 1/1995 | Wodrich et al. | 29/557 |
| 5,388,474 | 2/1995 | Tanaka et al. | 192/70.2 |

*Primary Examiner*—S. Thomas Hughes
*Assistant Examiner*—Jermie E. Cozart
*Attorney, Agent, or Firm*—Edgar A. Zarins; Lloyd D. Doigan

[57] ABSTRACT

A clutch housing for a vehicle transmission assembly and a method of making the same. The housing is generally cup-shaped with an axial hub. The outer wall of the housing is formed with a plurality of longitudinal splines of varying configurations. Select splines are formed at an increased depth. A groove is formed in the exterior surface of the housing at a depth sufficient to intersect the select splines of the inner surface thereby forming apertures through the wall of the housing. The dimensions of the apertures are determined by the configuration of the exterior groove and the interior splines.

10 Claims, 1 Drawing Sheet

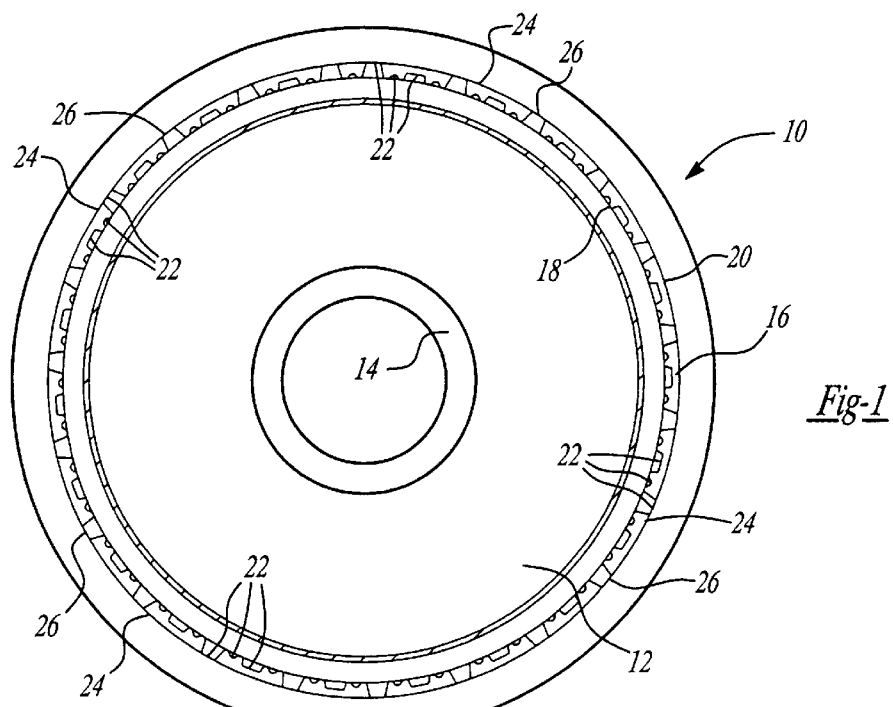
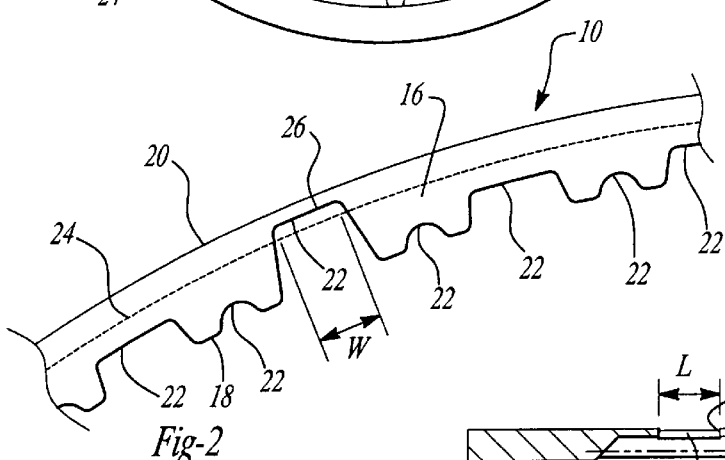
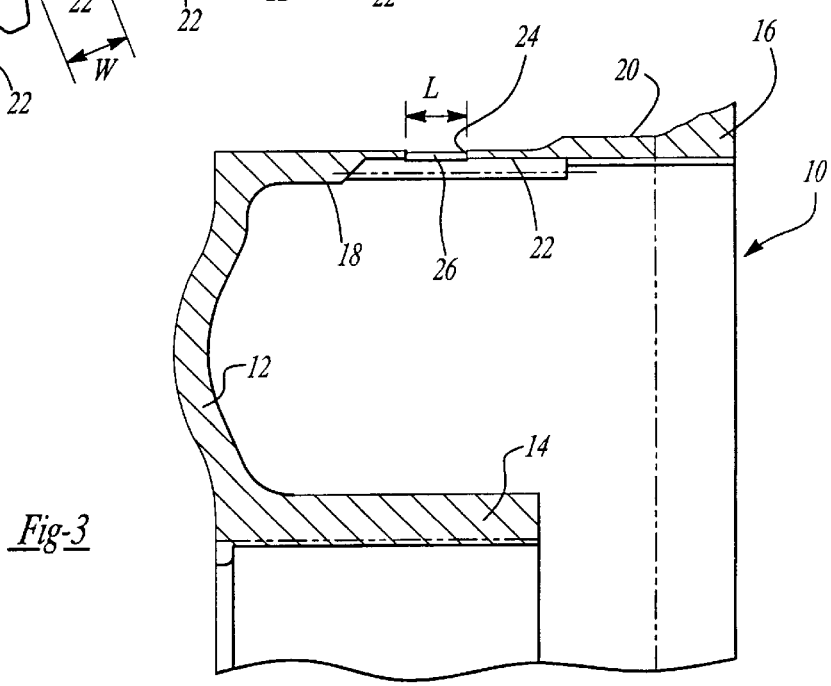

METHOD OF FORMING A VEHICLE TRANSMISSION CLUTCH HOUSING

BACKGROUND OF THE INVENTION

I. Field of the Invention

This invention relates to automatic transmission and transfer case clutch housings and, in particular, to a cost effective method of forming oil escape apertures and speed sensing slots in such clutch housings.

II. Description of the Prior Art

Manufacturers are continually developing more cost effective methods of developing automobile and truck components to reduce the manufacturing costs of vehicles. Metal components may be stamped flow formed from a blank and even formed from powder metal depending upon the configuration of the part.

Clutch housings for automatic transmissions and transfer cases have a generally cup-shaped configuration with an axial hub. The outer wall of the housing includes an inner surface having a plurality of longitudinal splines which determine the operation of the clutch housing in conjunction with variations in transmission fluid pressure. Typically, the clutch housing is flow formed from a blank to the desired configuration. Several machining operations are performed to form the desired configuration including punching apertures in the outer wall of the housing to create oil escape holes. This extra step requires the purchase and use of hole punch machines adding to the cost of manufacturing the clutch housing. In addition, such hole punching machines provide little flexibility in altering the position of the oil escape holes.

SUMMARY OF THE PRESENT INVENTION

This invention overcomes the disadvantages of the prior known methods of manufacturing transmission clutch housings by forming oil escape holes during machining of the outside diameter of the clutch housing.

The clutch housing formed using the method of the present invention has a generally cup-shaped configuration with an axial hub. The housing is preferably flow formed to a near-net configuration from a metal preform or blank. The flow forming operation forms a plurality of splines on the inner surface of the housing outer wall. The number and configuration of the splines is determined by the desired operating characteristics of the clutch housing. However, at least one of the splines is formed at an extra depth thereby increasing the major inner diameter of the housing at predetermined intervals. Accordingly, whereas several if not a majority of the splines will be formed at an increased depth forming an increased major diameter to the inner surface of the housing. A groove is machined into the outside diameter of the housing to a depth which will intersect the splines of increased depth thereby forming apertures through the wall of the housing. The dimensions of the oil escape apertures is determined by the width of the groove (forming the axial length of the aperture) and the width of the spline formed in the inner surface (forming the circumferential width of the aperture). Thus, the number, spacing and size of the apertures will be determined primarily by the inner splines formed in the housing and the groove machined on the outer surface of the housing. By varying these key features, oil escape holes can be formed without the need to punch through the housing or by increasing the dimensions, speed sensing slots may be provided in the outer wall of the housing.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the view and in which:

FIG. 1 is a plan view of a clutch housing formed using the method of the present invention;

FIG. 2 is an enlarged partial view of an outside wall of the clutch housing; and FIG. 3 is a partial cross-sectional view taken along lines 3—3 of FIG. 1.

DETAILED DESCRIPTION OF A PREFERRED EMBODIMENT OF THE PRESENT INVENTION

Referring to the drawings, there is shown a clutch housing 10 adapted to be used in automatic transmissions and transfer cases for vehicles. The present invention is directed to a clutch housing 10 having a plurality of oil escape holes and/or speed sensing slots and the method of manufacturing the clutch housing 10.

The clutch housing 10 has a generally cup-shaped configuration with an end wall 12, an inner axial hub 14 and an outer wall 16. The outer wall 16 includes an interior surface 18 defining an inner diameter and an exterior surface 20 defining an outer diameter. In accordance with the operating characteristics of the clutch housing 10, a series of longitudinal splines 22 are formed in the interior surface 18 of the outer wall 16. The splines 22 may be formed at varying intervals, lengths and depths for operation in a predetermined manner. In accordance with the present invention, at least one and preferably a plurality of the splines 22 are formed at a depth grater than the standard major inner diameter of the splines. The interval and number of splines 22 with increased depth is dependent upon the desired number of apertures through the outer wall 16 of the finished clutch housing 10. Although the selected splines 22 are formed at an increased depth, sufficient wall structure remains.

In order to form the oil escape holes, the exterior surface 20 of the outer wall 16 is machined to form a circumferential groove 24 transverse to the longitudinal splines 22. The groove 24 is machined to a depth sufficient to engage the increased depth splines 22 thereby forming an aperture 26 through the outer wall 16. The width W of the aperture 26 is determined by the width of the spline 22 while the length L of the aperture 26 is determined by the width of the circumferential groove 24. Thus, the outside diameter can be machined accordingly whether oil escape holes or speed sensing slots need to be formed in the clutch housing 10. Since these apertures do not need to be punched into the housing and the exterior of the housing must be machined anyway, the desired apertures can be formed at little or no extra cost in manufacturing. Furthermore, the size of the apertures 26 can be more precisely controlled through the machining operation as opposed to a punching operation.

The clutch housing 10 of the present invention is manufactured to form the required oil escape holes in the housing wall. In a preferred method of manufacture, the housing 10 is flow formed from a solid or preformed blank to a near-net configuration. During the flow forming operation, the splines 22 are formed in the interior surface 18 of the outer wall 16 including splines of a greater depth to eventually form the apertures 26. Thereafter, the exterior surface 20 is machined to the desired configuration including the machining of groove 24 to intersect the select splines 22. The dimensions of the groove 24 in conjunction with the dimensions of the spline 22 will determine the configuration of the apertures 26 formed through the outer wall 16 of the clutch housing 10. Accordingly, while the method still requires flow forming and machining apparatus, an apparatus for punching the apertures 26 in the housing wall 16 is no longer needed.

The foregoing detailed description has been given for clearness of understanding only and no unnecessary limitations should be understood therefrom as some modifications will be obvious to those skilled in the art without departing from the scope and spirit of the appended claims.

What is claimed is:

1. A method for forming a housing for a vehicle component comprising the steps of:

forming a housing body having an outer wall, said housing wall including an interior surface and an exterior surface;

forming a plurality of longitudinal splines on said interior surface of said housing wall, at least one of said splines formed at a predetermined first depth; and machining a circumferential groove in said exterior surface of said housing wall to remove material sufficient to engage said at least one of said splines formed at said first depth thereby forming an aperture having a closed periphery through said outer wall.

2. The method as defined in claim 1 wherein said housing body is flow formed with said outer wall, said longitudinal splines formed on said interior surface during flow forming of said housing body.

3. The method as defined in claim 2 wherein said circumferential groove is formed in said exterior surface transverse to said longitudinal splines, said groove formed at a predetermined second depth to intersect said at least one spline formed at said first depth thereby forming said aperture.

4. The method as defined in claim 3 wherein said aperture has dimensions corresponding to a width of said machined groove and a width of said at least one longitudinal spline.

5. The method as defined in claim 4 wherein the number of apertures formed in said outer wall of said housing corresponds to the number of splines formed at said first depth.

6. The method as defined in claim 2 wherein said housing body has an end wall integral with said outer wall and an axial hub integrally formed with said end wall.

7. The method as defined in claim 6 wherein said housing is a clutch housing for use in vehicle transmission assemblies.

8. A method for forming a clutch housing adapted to be used in a vehicle transmission comprising the steps of:

forming an integral housing body having an outer wall, an end wall and an axial hub, said outer wall including an interior surface and an exterior surface;

forming a plurality of longitudinal splines in said interior surface of said housing outer wall, at least one of said splines formed at a predetermined first depth greater than the depth of the remaining splines; and machining a circumferential groove in said exterior surface of said outer wall transverse to said longitudinal splines, said circumferential groove machined to a predetermined depth sufficient to intersect said at least one spline formed at a predetermined first depth thereby forming a closed periphery aperture through said outer wall.

9. The method as defined in claim 8 wherein said housing body is flow formed, said longitudinal splines formed on said interior surface during flow forming of said housing body.

10. The method as defined in claim 9 wherein said at least one aperture in said outer wall has dimensions corresponding to a width of said machined groove and a width of said at least one longitudinal spline.

* * * * *